United States Patent [19]

Williamson et al.

[11] Patent Number: 4,877,363
[45] Date of Patent: Oct. 31, 1989

[54] BLIND FASTENER

[75] Inventors: Herman L. Williamson, Seal Beach; Michael M. Schuster, Santa Monica, both of Calif.

[73] Assignee: Hi-Shear Corporation, Torrance, Calif.

[21] Appl. No.: 13,011

[22] Filed: Feb. 10, 1987

[51] Int. Cl.⁴ .............................................. F16B 13/04
[52] U.S. Cl. ...................................... 411/43; 411/34; 411/55
[58] Field of Search ...................................... 411/34–38, 411/43, 45, 55, 70, 41

[56] References Cited

U.S. PATENT DOCUMENTS 4,752,169  6/1988  Pratt ........................................ 411/43
4,772,167  9/1988  Beals ....................................... 411/43

Primary Examiner—Neill R. Wilson
Attorney, Agent, or Firm—Donald D. Mon

[57] ABSTRACT

A blind fastener having an internally threaded sleeve with a head at one end and a taper at the other. A mandrel is threaded into and through the sleeve, and has a head that bears against a collar which it pushes onto the tapered end of the sleeve. A nut is threaded onto the mandrel to be turned against the head of the sleeve. In turn, the nut is restrained against rotation by a torque tool, and the mandrel is engaged by the tool to turn them counter-rotatively to set the fastener. The nut has a face that faces toward the head of the sleeve that is adapted to make at least a partially conforming engagement with recesses in the head of the sleeve.

4 Claims, 1 Drawing Sheet

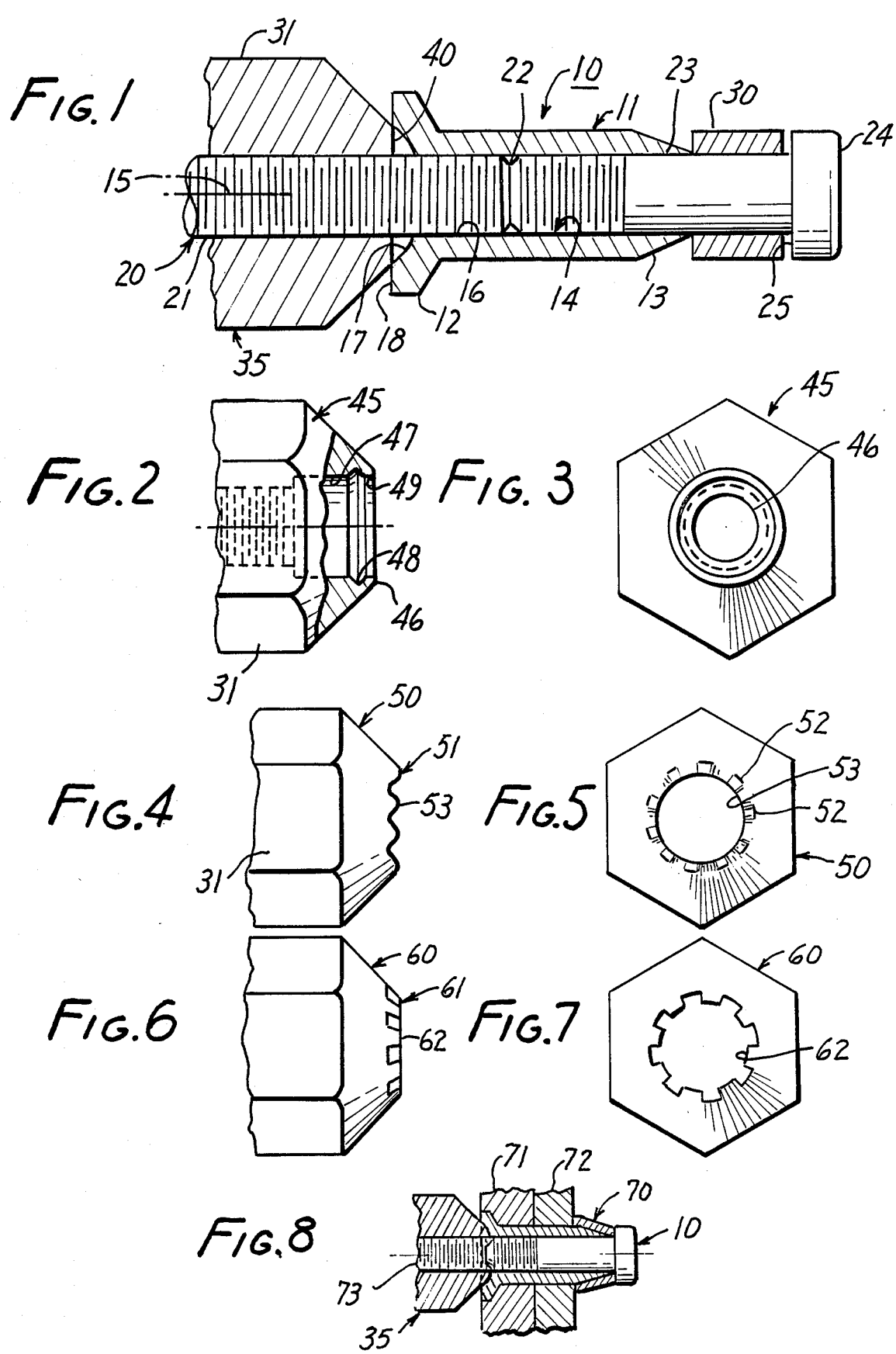

BLIND FASTENER

FIELD OF THE INVENTION

This invention relates to a blind fastener for joining workpieces together, all assembly procedures being conducted from only one side of the work.

BACKGROUND OF THE INVENTION

A blind fastener of the type with which this invention is concerned is shown in Wing and Schuster U.S. Pat. No. 3,129,630. This fastener has enjoyed continuous and very substantial sales to this day, and has been the subject of many improvements.

This type of fastener has a tubular sleeve with a shank, a tapered end, and at its other end, a head. A threaded mandrel is threaded into and through the shank. It has a head that faces toward the tapered end of the sleeve. A cylindrical collar is placed on the mandrel, and turning the mandrel draws its head against the collar, forcing the collar onto the sleeve, thereby forming an enlargement. The combination of the head on the sleeve, and the enlarged collar, pulls and holds the workpieces together, and the shank provides resistance to shear forces. The device then functions as a blind rivet or as a blind bolt.

The mandrel and the head of the sleeve are provided with torque tool engaging means so the mandrel can be turned in the sleeve to set the fastener. A groove is formed in the mandrel so that excess length of the mandrel will torque off at that location after the fastener has been set.

As stated, this fastener, commonly known by its trade names as the "Beta Bolt" and "Beta-Lok", has been sold successfully by Hi-Shear Corporation of Torrance, Calif. for many years, and still is. In order to make the device more useful and convenient for assembly operations, attention has been given to the accessible end of the fastener. The fastener parts which remain in the completed assembly after setting remain basically unchanged.

In the Wing and Schuster device, tool engaging recesses are formed in the head of the sleeve. The tool which sets the fastener has a nose with projections that enter into these recesses to hold the sleeve against rotation. The tool also includes a drive portion that engages the mandrel, and when turned rotates the mandrel so it moves axially to set the fastener.

Disadvantages of this arrangement are that nose pieces wear out, that sharp protruding end features that engage the recess can slip out and mar a surface, and that the portions of the mandrel which break off are relatively small, and sometimes tend to get away from the assemblers.

It has been suggested that, instead of engaging the head of the fastener, the tool could instead be provided with means to engage a nut threaded onto a lengthened mandrel adjacent to the head of the sleeve. Then the nut would be turned down against the head of the sleeve to jam on it. This would constitute means to hold the sleeve against rotation, and the nut would be a throwaway item that would keep the torqued off portion of the mandrel under control. However, this arrangement does not constitute a firm structural resistance to rotation. Instead it relies on the coefficient of friction and the applied forces to be suitable, always, for the intended function. In the opinion of the inventors, this is not optimal design.

Accordingly, it is an object of this invention to attain the advantages of using a separate nut for tool engagement purposes, while still providing a structural resistance to relative rotation between the nut and the sleeve.

BRIEF DESCRIPTION OF THE INVENTION

This invention is carried out in a blind fastener that includes an internally threaded sleeve with a head at one end and an extended taper at the other. A mandrel is threaded into and through the sleeve, and has a head that bears against a collar which it pushes onto the tapered end of the sleeve. A nut is threaded onto the mandrel to be turned against the head of the sleeve. In turn, the nut is restrained against rotation by a torque tool, and the mandrel is engaged by the tool to turn them counter rotatively to set the fastener.

According to this invention, the nut has a face that faces toward the head of the sleeve which is adapted to make at least a partially conforming engagement with recesses in the head of the sleeve, thereby reliably to restrain the sleeve against free rotation.

According to a preferred but optional feature of the invention, the end of the nut which abuts the head of the sleeve deforms to make the conforming engagement.

The above and other features of this invention will be fully understood from the following detailed description and the accompanying drawings, in which:

BRIEF DESCRIPTION OF THE DRAWINGS

FIG. 1 is an axial section of a generic fastener with which the invention is useful FIG. 2 is a side view partly in cutaway cross-section of a fragment of FIG. 1 showing the presently-preferred embodiment of the invention;

FIG. 3 is a right hand end view of FIG. 2;

FIG. 4 is a side view partly in cutaway cross-section of a fragment of another embodiment of the invention.

FIG. 5 is a right hand end view of FIG. 4.

FIG. 6 is a side view partly in cutaway cross-section of a fragment of still another embodiment of the invention;

FIG. 7 is a right hand end view of FIG. 6; and

FIG. 8 is an axial section of the set fastener of FIG. 1, just before breaking away the setting portions.

DETAILED DESCRIPTION OF THE INVENTION

In FIG. 1 there is shown a blind fastener 10 in its preassembled, ready-to-set condition. It is basically the device of the above-cited Wing and Schuster patent, which is incorporated herein by reference for its showing of the device, its general specifications, and of its installation.

Briefly stated, the fastener includes a sleeve 11 having a countersink head 12 at one end, an axially extending taper 13 at the other end, and an axial passage 14 extending from end to end along central axis 15. An internal thread 16 is formed in the wall of the passage.

Tool-engaging recesses 17 are formed in the end surface 18 of the head of the sleeve. A cruciform array of radially extending recesses is a convenient arrangement.

A mandrel 20 has a shank with an external thread 21, a torque-off groove 22, an unthreaded cylindrical portion 23 and a head 24. The head has a bearing face 25 that faces toward the tapered end of the sleeve.

A collar 30 is spindled on the unthreaded portion of the mandrel, between the head of the mandrel and the tapered end of the sleeve.

A nut 35 is threaded to the mandrel externally of the sleeve. It has wrenching surfaces 31, optionally in a hexagonal array for engagement by a torque tool (not shown). The mandrel has beyond the wrenching surfaces, engageable flats (not shown) for engagement by another part of the torque tool. The tool then functions to turn the mandrel relative to the sleeve and the nut.

The nut has a bearing face 40 that is intended to bear against end surface 18 of the sleeve. The features of this invention relate to bearing face 40. Bearing face 40 is shown generically, without deformation relative to surface 18. Schematically, there is no disclosed interaction between recesses 17 and face 40 in FIG. 1.

FIGS. 2 and 3 show a nut 45 identical in all respects to nut 35 except for its bearing face 46 and is intended to be directly substituted for nut 35. In this preferred embodiment, a counterbore 47 is formed, with an internal groove 48 that forms a relatively thin circumferential lip 49. When this lip is brought strongly against surface 18, the lip deforms so that there is at least some entry of the lip into the recesses. This entry, while not especially large, serves as a structural and effective restraint to relative rotation between the nut and the sleeve.

FIGS. 4 and 5 show a nut 50 identical in all respects to nut 35, except for its bearing face 51 which also is intended to be directly substituted for nut 35. In this embodiment, depressions or scallops 52 are formed, with intervening raised portions 53. When the nut is brought strongly against the sleeve, the raised portions tend to enter the recesses, and the material around them tends to conform somewhat to parts of the recesses, in the sense of permanent deformation.. Again, this is a firm structural restraint against relative rotation between the nut and the sleeve.

FIGS. 6 and 7 show a nut 60 identical in all respects to nut nut 35 except for bearing face 61 which also is intended to be substituted for nut 35. In this embodiment, fingers 62 are spaced apart around the passage. They are sufficiently deformable to enable the nut and the surface to inter-engage. Again, the deformation need not be particularly large, because the inter-engagement of the fingers and recesses even to a small extent will exert a substantial restraint.

In FIGS. 4–7, the scallops and fingers will be proportioned to encourage permanent deformation and the described inter-engagement.

FIG. 8 shows the fastener of all embodiments, assembled. The collar has been drawn cut to the tapered end of the sleeve where it forms a head 70 that cooperates with the head of the sleeve to hold the workpieces 71, 72 assembled together. Part of the bearing face of the nut has entered the recesses. The sleeve serves to resist shear forces. The mandrel is shown about to torque off at the groove and when it does, its free end 73 and nut 35 will leave the assembly. The free end will still be engaged to the nut and is more easily kept under control.

It is preferred practice to provide more fingers than recesses, in order that there will certainly be some permanent deformation. Otherwise it may be possible for all fingers to hit a surface area outside of the recesses and therefore not deflect for prevention of relative rotation.

This invention thereby provides a nut to use as a disposable part of tooling to set the fastener, whose bearing face is adapted for optimum engagement with the sleeve of the fastener.

This invention is not to be limited by the embodiments shown in the drawings and described in the description, which are given by way of example and not of limitation, but only in accordance with the scope of the appended claims.

We claim:

1. In a blind fastener of the type having an axially extending sleeve with an axially extending internally threaded passage therethrough, a head at one end having an axially facing surface thereon with off-axis recesses therein, and an external taper on the other end; a mandrel including an extended threaded shank threaded into and through said passage, a head on said mandrel with a bearing surface facing said tapered end, and torque tool engaging means on the opposite side of the said sleeve from said head; a tubular collar on said mandrel between said tapered end and said head; and a nut threaded to said mandrel with a bearing face facing toward said surface of the head of said sleeve, the improvement comprising:

said bearing face of said nut being adapted to deform so as at least partially to enter and engage in said recesses in the head of said sleeve; and said bearing face being scalloped to form relieved and projecting portions, the latter to make said entry, deforming while doing so.

2. In a blind fastener of the type having an axially extending sleeve with an axially extending internally threaded passage therethrough, a head at one end having an axially facing surface thereon with off-axis recesses therein, and an external taper on the other end; a mandrel including an extended threaded shank threaded into and through said passage, a head on said mandrel with a bearing surface facing said tapered end, and torque tool engaging means on the opposite side of the said sleeve from said head; a tubular collar on said mandrel between said tapered end and said head; and a nut threaded to said mandrel with a bearing face facing toward said surface of the head of said sleeve, the improvement comprising:

said bearing face of said nut being adapted to deform so as at least partially to enter and engage in said recesses in the head of said sleeve; and said bearing face being formed as a plurality of permanently deformable fingers which are so proportioned and arranged as to make said entry, deforming while doing so.

3. A blind fastener according to claim 2 in which said plurality at deformable fingers exceed in number said off-axis recesses.

4. A blind fastener according to claim 3 in which said number of said plurality of deformable fingers is at least twice said plurality of said recesses.

* * * * *